United States Patent [19]

Nachsi et al.

[11] 3,899,647

[45] Aug. 12, 1975

[54] BUTTON TELEPHONE LOCK GUARD

[76] Inventors: Zolman Nachsi, 613 Bedford Ave.; Abraham Zorger, 226 Broadway, both of Brooklyn, N.Y.

[22] Filed: July 20, 1973

[21] Appl. No.: 381,076

[52] U.S. Cl. .......... 179/189 D
[51] Int. Cl.² .......... H04M 1/66
[58] Field of Search .......... 179/189 D, 189 R, 178, 179/179

[56] References Cited

UNITED STATES PATENTS

| | | | |
|---|---|---|---|
| 1,620,628 | 3/1927 | Beth | 179/189 D |
| 1,717,147 | 6/1929 | Daily | 179/189 D |
| 1,762,726 | 6/1930 | Martin | 179/189 D |
| 2,572,478 | 10/1951 | Hawkins | 179/178 X |
| 3,624,317 | 11/1971 | Buckingham et al. | 179/189 R |

*Primary Examiner*—Thomas W. Brown

[57] ABSTRACT

In a preferred embodiment of the invention, for securing the concealment against unauthorized use of the dial push-buttons of a push-button telephone, a lock-on mechanism having metal strips that either circumscribe the telephone structure at the position of location of the push-buttons or which — in the absence of circumscribing the entire telephone body — clamp onto edges of the telephone structure, preferably there being included a hinge structure such that the locking abutting ends are at least one pivotal upwardly away from the other to make accessible the push-buttons, and the button-covering strip of metal having preferably a plurality of downwardly extending parallel flanges running longitudinally along the strip toward the hinge structure such that when in the locked state the substantially perpendicularly extending flanges — relative to the underside face of the metal strip cover — fit between the consecutive rows of push-buttons preventing the possibility of the locked strip from being slipped laterally from over the push-buttons.

6 Claims, 4 Drawing Figures

BUTTON TELEPHONE LOCK GUARD

This invention relates to a protective telephone guard for locking the telephone against unauthorized use, this invention being directed to the push-button telephone in particular.

BACKGROUND OF THE INVENTION

Prior to the designing and coming into more common usage of the push-button telephone, there have existed a variety of telephone guards for the older type models, many of which were bulky while others were fully acceptable, but none of which fully satisfactorily are suited for locking of a push-button telephone against unauthorized use. It is also noteworthy that because of the trend toward ultra-modern styling of modern telephones of the push-button types, there is little provided onto which locking structures may be readily secured, together with the undesirability to have unsightly and/or bulky structures which either mar the telephone or make it distasteful to use such locking structures. Also, it is important from both the storage standpoint and the cost of manufacture and distribution, as well as the ease of manipulation thereof that the locking structure be simple in nature and attractive and light-weight, yet fully effective and sturdy.

SUMMARY OF THE INVENTION DISCLOSURE

Accordingly, objects of the invention include the overcoming of one or more difficulties and/or disadvantages of the type(s) noted above while concurrently obtaining additional advantages and desired features noted hereafter.

Another object, in particular, is to obtain a simple pivotal type locking device merely wrapable around the button-carrying portion of the telephone structure to totally secure concealment of the buttons against unauthorized use thereof.

Another object is to obtain an at-least partially circumscribing structure which is not shiftable nor slidable laterally from over the concealed buttons, while not requiring any major attachment nor other modification of the telephone structure.

Another object is to obtain a telephone-button concealing structure which does not require any marring nor attachments to be secured to the telephone casing, base or the like.

Another object is to obtain a button-covering lock device for a telephone of the push-button type, which device is light weight and portable for easy detachment and easy subsequent mounting and for easy storing inbetween locking uses.

Other objects become apparent from the preceding and following disclosure.

One or more objects of the present invention are obtained by the invention described herein.

Broadly the invention includes the providing of two opposingly lockable pivotal structures snapable around the telephone body portion carrying push-buttons for the dialing of the telephone, together with structure means for preventing the locked structures from being able to be shifted from over the concealed push-buttons. In one typical embodiment, there are provided solely two pieces, one being pivotably attached to the other and the two being jointly shaped to circumscribe snugly the push-button-carrying portion of the telephone and having the free ends of each lockable to each other abuttingly when closed over the pushbuttons. While in another embodiment, there are provided two spaced-apart separate clamp-on structures each having at the lower end thereof a u-shaped bend such that it may be hooked under and around the bottom-edge of a telephone cover casing in which the telephone mechanism is mounted, and one of the spaced-apart clamp-on structures having a hinged metal strip portion which pivots to and fro over and is lockable downwardly over and concealably of the pushbuttons by locking means matably on the free end of the pivoted strip and on the free end away from the hooked end for the other clamp-on structure, the clamp-on structures being promptly and unretardably removable from the telephone structure when in the unlocked state by merely slipping-of the u-shaped bend from under the telephone case side bottom edge. Similarly, the circumscribing structure first-noted above when unlocked merely open as jaws to dis-envelope the telephone structure. Although it is possible for the anti-shifting structure to be any type of downwardly extending projection from the underside of the portion of the metal strip which overlaps the push-buttons provided the projection is shaped narrowly enough to fit between the opposing rows of buttons or between two opposing buttons, and although it equally is essential for the projection to be positioned between at least two buttons in alignment transversely to the longitudinal axis of the metal strip with the longitudinal axis extending toward the hinge structure such that when locked the projection will be pressed against one or the other of the buttons between which it is positioned if and whenever there is any attempt to slide or shift the locked structure laterally from over the push-buttons, in a preferred embodiment there are provided as the projections a plurality of downwardly extending flanges parallel to one another running between the free locking end of the button-covering metal strip and the hinged end thereof, the flanges being substantially perpendicular to the under-surface of the button-covering metal strip. The totally circumscribing embodiment is particularly adaptable to the button-type telephone in which the push-buttons are located on the hand receiver thereof positioned between the mouthpiece and the earpiece thereof.

The invention may be better understood by reference to the Figures.

THE FIGURES

FIGS. 1, 2, and 3 illustrate in various view a first embodiment of the present invention, in which the telephone guard fits around the main body of the telephone in which the pushbuttons are located thereon, for such an embodiment the clamp-on embodiment described above being utilizable, as well as the second embodiment also being optionally adaptable to this type telephone. In particular, the FIG. 1 discloses a perspective top view of a typical push-button telephone having mounted thereon the inventive clamp-on embodiment of the present invention, shown in the locked state, illustrating in phantom and in partial cut-away-view the buttons concealed under the cover and showing in phantom the parallel flanges extending from the locking-end toward the hinged end of the pivotal metal strip. FIG. 2 illustrates a view in cross-section of the locking device, as taken along line 2—2 of FIG. 1, and FIG. 3 illustrates a view as elevation bottom view of the pivotable metal plate and downwardly-extending flanges therefrom and in cross-section through the push-buttons between which rows the parallel flanges extend, as taken along line 3—3 of FIG. 2.

FIG. 4 illustrate in top perspective view the locking device of the second-described embodiment, totally circumscribing the push-button-containing telephone hand receiver, phantom line illustrating the circumscribing portion behind the body of the telephone hand receiver, with the parallel strip-flanges being shown in phantom through the over-lapping metal strip lockable over the push-buttons.

DETAILED DESCRIPTION OF THE INVENTION

Figure 1:
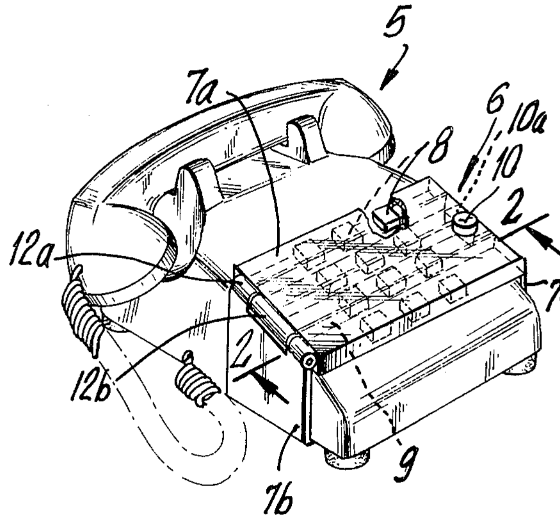
Figure 2:
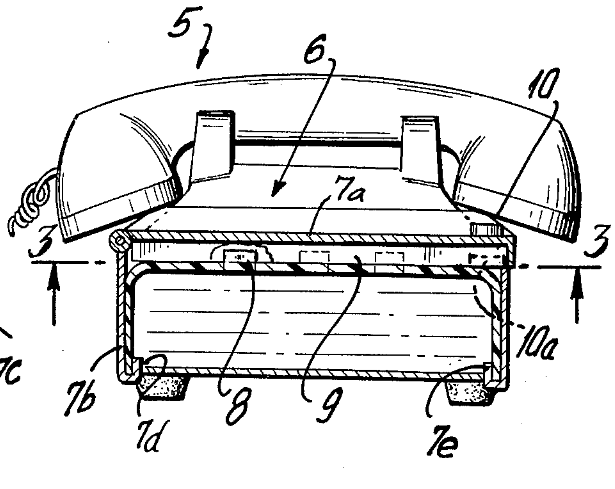
Figure 3:
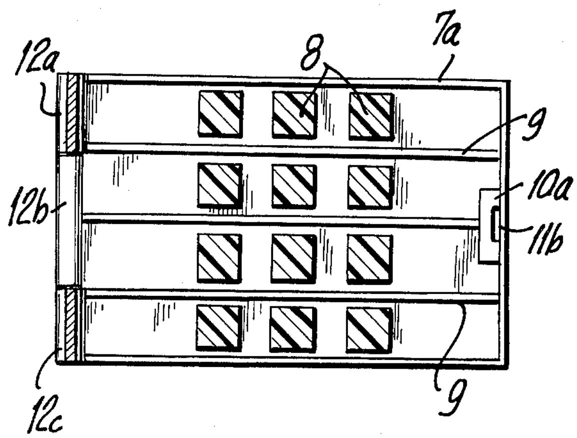
Figure 4:
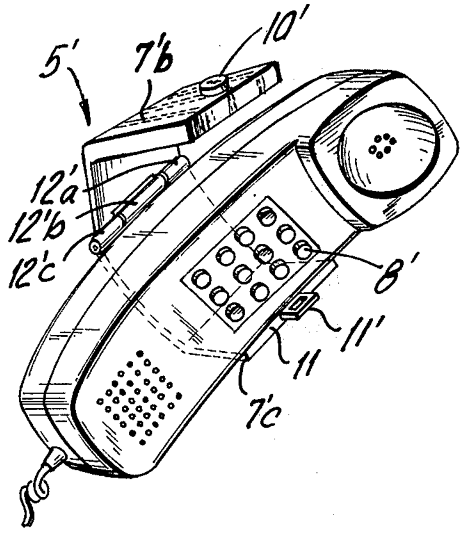

In greater detail, there is shown in FIG. 1 a telephone 5 of the push-button type and mounted thereon in a locked state a clamp-on device 6 of the present invention, including opposite and separate clamp-on ends 7*b* and 7*c* and the intermediate hinged metal strip 7*a* carrying on its underside downwardly extending parallel flanges 9 extending between rows of buttons 8 in a longitudinal direction betwen the locking mechanism 10 and the hinge elements 12*a* and 12*b*, and the pin therethrough, there also being shown in phantom the matable locking portion 10*a* of member 7*a*, also shown in phantom in FIG. 2 and shown in solid lines in FIG. 3. The same parts are shown if the FIG. 2 view, together with the u-shaped lips 7*d* and 7*e* which are hooked under the edges of the opposite sides of the telephone casing. Similarly the view of FIG. 3 further illustrates the hinge elements 12*a*, 12*b*, and 12*c* as well as being taken beneath the structure 10*a* having through port 11*b* be; in the FIG. 4 embodiment, the same type of mechanism is employed, the pin 11′ being insertable though a port of the lock mechanism of lock structure 10′ of FIG. 4. In each of the FIGS. 1 through 4 the locking mechanism is moreover intended to be solely diagrammatic of and representative of any desired and/or convention locking mating structure(s), it being with ordinary skill to utilize the desired lock here, the invention being otherwise in the overall structure and combination with a suitable locking mechanism. The numerals of FIG. 4 correspond to corresponding parts of FIGS. 1 through 3.

It is within the spirit and scope of the present invention to utilize any variations and modifications and substitution of equivalents as would be apparent to a person of ordinary skill in this art.

I claim:

1. A button-telephone lock-guard device comprising in combination: at least first and second structure means, one including a first portion of a locking means and the other including a second portion of a locking means, the first and second locking portions comprising in combination a locking means for locking releasably one to the other, at least one of the first and second structure means including at least one downwardly extending partition element of a predetermined size and shape received between adjacent buttons of a push-button telephone when the locking means is in a locked state, each of the first and second structure means including securing means fastened securely to and at least partially circumscribingly of a button-containing portion of the push-button telephone when the locking means is in a locked state such that when each of the first and second structure means are fastened to the push-button telephone having push buttons, and the locking means in a locked state, the at least one downwardly extending partition element extending longitudinally along with of the first and second structure means, providing thereby against lateral shifting of the first and second structure means and also providing thereby a deterrent against access to the buttons, each partition element being an elongated thin flange extending downwardly from an upper portion of at least one of the first and second structure means at substantially a right angle thereto.

2. A button-telephone lock-guard device comprising in combination: at least first and second structure means, one including a first portion of a locking means at a first end thereof and a hinge element at an opposite end thereof, and the other including a second portion of a locking means at a first end thereof and a second hinge element at an opposite end thereof, a hinge means comprising said first and second hinge elements for pivoting the first and second structure means on one another, the first and second locking portions comprising in combination a locking means for locking releasably one to the other, at least one of the first and second structure means including at least one downwardly extending partition element of a predetermined size and shape received between adjacent buttons of a push-button telephone when the locking means is in a locked state, the at least one downwardly extending partition element extending longitudinally along with of the first and second structure means, providing thereby aghinst lateral shifting of the first and second structure means and also providing thereby a deterrent against access to the buttons, each partition element being an elongated thin flange extending downwardly from an upper portion of at least one of the first and second structure means at substantially a right angle thereto, each of the first and second structure means defining a metal strip being shaped to fit around a body portion of a push-button telephone when the first and second structure means are in a locked state.

3. A button-telephone lock-guard device of claim 2, in which there are a plurality of said flanges extending parallel to one-another and extending longitudinally of at-least-one said metal strips, substantially all of the flanges extending perpendicularly downwardly from the metal strip.

4. A button-telephone lock-guard device of claim 1, in which the securing means include terminal U-shaped flanges engageable around opposite bottom edges of side walls to a telephone casing.

5. A button-telephone lock-guard device of claim 1, in which at least one of said first and second structure means comprises two end-to-end metal strips and hinge structure joining two abutting ends of the metal strips, such that one of the hinged metal strips is a pivotal strip pivotable to and fro between an open position and a closed locking position over push-buttons of a push-button telephone, said plurality of parallel flanges extending downwardly from a lower face of the pivotal strip, one of said locking portions being mounted fixedly on a distal free end of the pivotal strip.

6. A button-telephone lock-guard device of claim 3, in which one of said locking portions is mounted fixedly on a distal free end of one of the metal strips and the other of said locking portions is mounted fixedly on a distal free end of the other of the metal strips.

* * * * *